United States Patent [19]

Shannon

[11] 4,254,397
[45] Mar. 3, 1981

[54] INDICATOR ARRANGEMENT

[76] Inventor: Brian Shannon, 8 Cairndale Dr., Leyland, Preston PR5 2BX, Lancashire, England

[21] Appl. No.: 20,190

[22] Filed: Mar. 13, 1979

[30] Foreign Application Priority Data

Mar. 22, 1978 [GB] United Kingdom ............... 11325/78
Aug. 9, 1978 [GB] United Kingdom ............... 32765/78

[51] Int. Cl.³ .............................................. B60Q 1/40
[52] U.S. Cl. ........................................ 340/56; 340/73
[58] Field of Search ......................... 340/56, 73, 81 R; 315/77

[56] References Cited

U.S. PATENT DOCUMENTS

| 3,555,506 | 1/1971  | Daws .................................... 340/56 |
| 3,555,507 | 1/1971  | Burson, Jr. ............................. 340/56 |
| 3,858,177 | 12/1974 | Kugelmann et al. .................. 340/73 |
| 4,058,797 | 11/1977 | Sekiguchi et al. ..................... 340/56 |

Primary Examiner—Alvin H. Waring
Attorney, Agent, or Firm—Ross, Ross & Flavin

[57] ABSTRACT

An indicator arrangement comprising an indicator lamp on each side of a vehicle and selectively connectable to a power supply via a selector switch and a control circuit, the control circuit including a pulse generator capable of supplying pulses to the lamp(s) selected and a timer operative to de-activate the pulse generator after a pre-determined time.

4 Claims, 4 Drawing Figures

INDICATOR ARRANGEMENT

This invention relates to an indicator arrangement, particularly, but not exclusively for a motor cycle.

It is common for indicators, i.e. flashing lights, to be installed on motor cycles. However, it is extremely difficult to arrange for them to be self-cancelling. In a motor car, self-cancelling devices can readily be based upon the pivoting of the steering wheel that accompanies turning. However, the pivoting of the handlebars of a motor cycle is very small compared with the pivoting of a vehicle steering wheel, and the movement cannot practicably be used to actuate self-cancelling indicators. An object of the invention is to provide an indicator arrangement whereby the above disadvantage can be obviated or minimised.

Accordingly, the invention provides an indicator arrangement comprising an indicator lamp on each side of a vehicle and selectively connectable to a power supply via a selector switch and a control circuit, the control circuit including a pulse generator capable of supplying pulses to the lamp(s) selected and a timer operative to de-activate the pulse generator after a predetermined time.

Preferably the selector switch acts as a reset for the timer.

The invention also provides an indicator arrangement comprising indicator lamps on each side of a vehicle and selectively connectable to a power supply via a selector switch and a control circuit comprising a pulse generator, a timer operative to switch off the pulse generator after a predetermined time, and a transistor switch, between the power supply and the selector switch, controlled by the pulse generator. The arrangement of the invention, when using transistors as the switching means, is substantially insensitive to the wattages of the indicator lamps and can thus be used with a wide range of lamp wattages.

The invention will be described further, by way of example, with reference to the accompanying drawings which illustrate a preferred embodiment thereof, it being understood that the following description is illustrative and not limitative of the scope of the invention. In the drawings.

A first preferred embodiment of indicator arrangement 10 of the invention comprises lamps Lp1 to Lp4 and a selector switch SW1. This configuration of switch and lamps is conventional. Lp1 and Lp2 are left-hand indicator lamps, Lp3 and Lp4 are right-hand indicator lamps, and Lp5 is a warning lamp. The supply from the power source (not shown) is via resistors R1, R2 and R3, the latter two of which can by bypassed by contact RL1 of Relay RL/1. The line from source to SW1 is connected to a time switch controlling a pulser by a transistor TR1. Capacitor C1 prevents the pulsing in that line from falsely activating the time switch. Operation of the circuit will now be described.

With switch SW1 in its centre positions the lamps Lp1–5 are unlit, transistor TR1 is held off and the timing circuits do not operate.

With SW1 operated to position "a", a small current flows through resistors R1, R2, R3 and the lamps but with contact RL1 opens the lamps are unlit. The Potential difference developed across R1 and R2 switches TR1 on. Current is supplied to the timing circuits and the monostable switches on allowing the astable switch to operate and release relay RL. RL operates contact RL1.

During the periods when RL1 is closed lamps Lp1.2 and 5 are lit. The potential difference developed across R1 by the increased current flow maintains TR1 in the on condition and the timing circuits continue to operate. RL1 continues to make and break, flashing the lamps until on completion of the monostable timing period, say 15–30 seconds, the monostable holds the astable off and the lamps cease to flash. Reoperation of SW1 to position "a" or "b" will initiate a new period of flashing. Capacitor C1 prevents pulses from RL1 affecting the operation of the timing switches.

Figure 1:
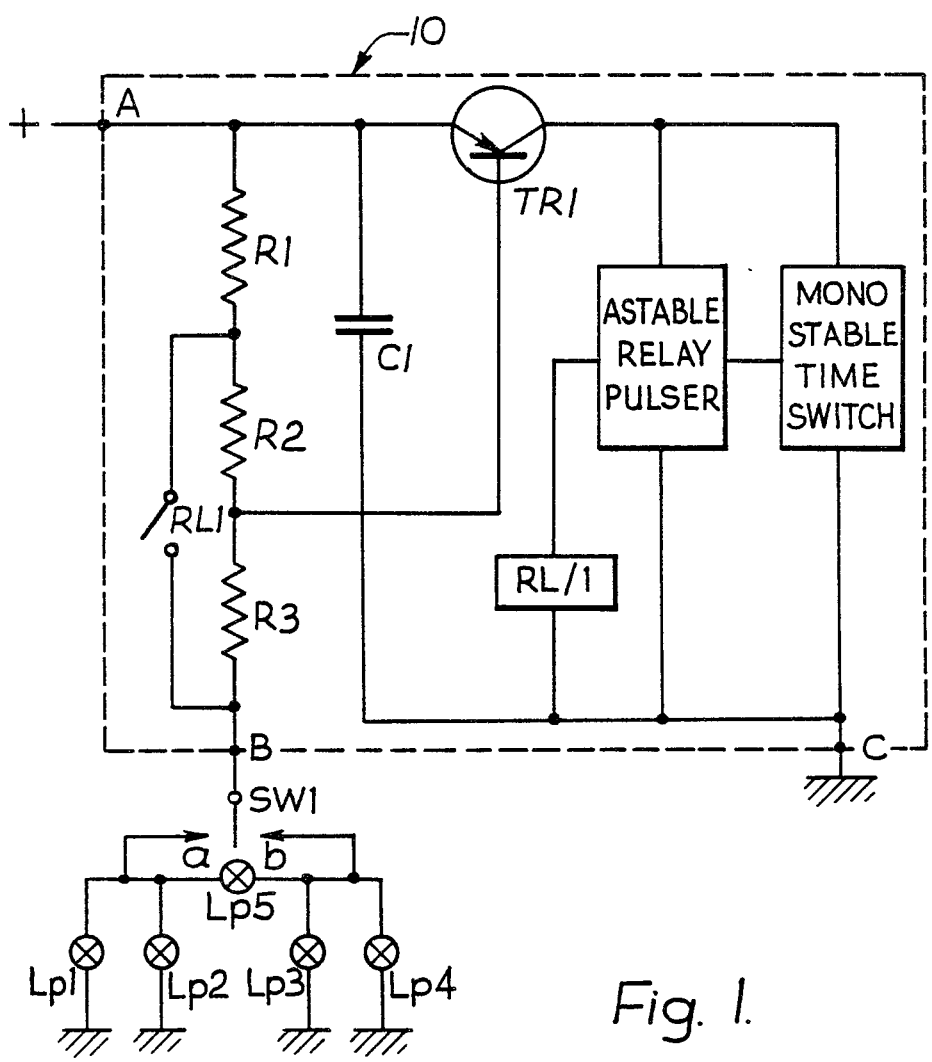
FIG. 1 is a schematic circuit diagram of a preferred embodiment of arrangement of the invention.
Figure 2:
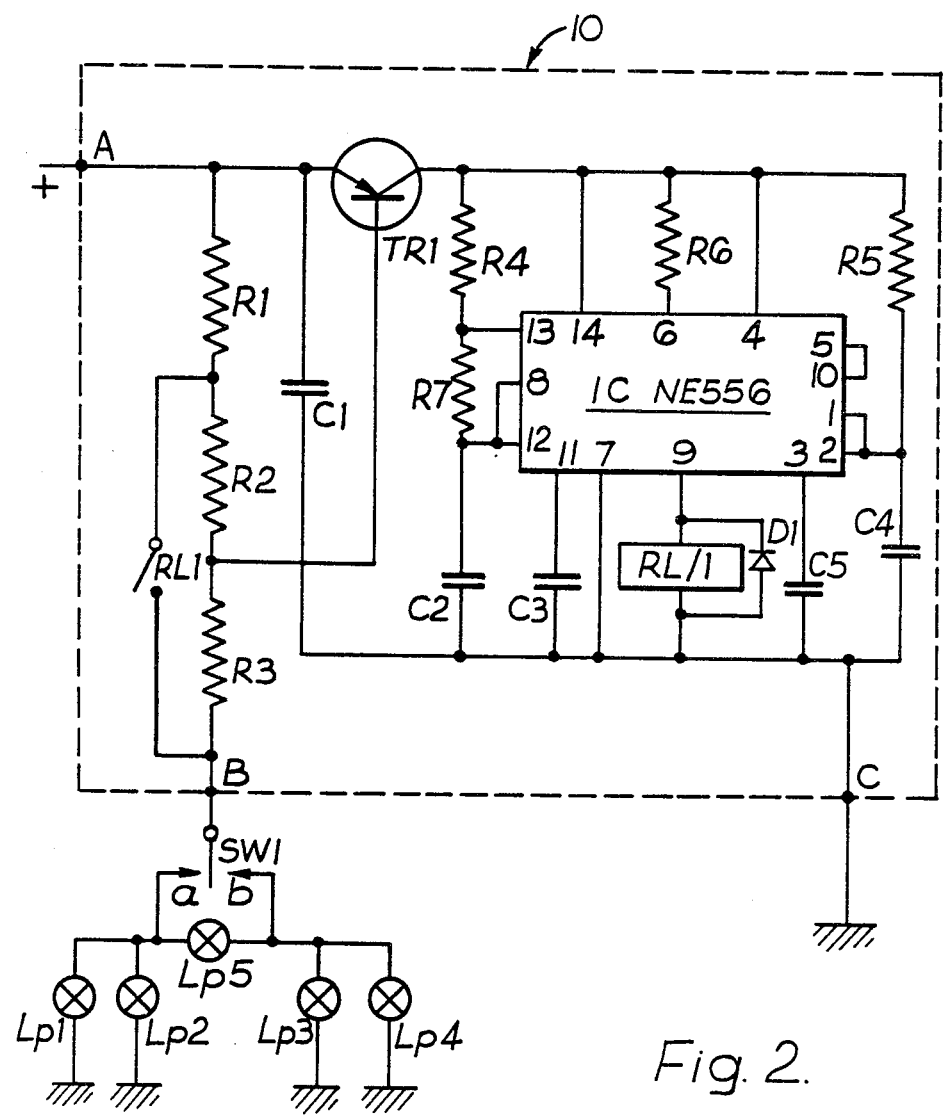
FIG. 2 is a more detailed circuit diagram showing how the arrangement would be constructed in practice.

As will be seen from FIG. 2, the monostable time switch and the astable relay pulser are, in practice, incorporated in an integrated circuit 1C of type NE556. The circuit of FIG. 2 operates precisely as described in relation to FIG. 1.

The R/C combination of R4, R7 and C2 determines the time constant of the pulser and ensures a pulsing rate of about 1 hertz. R/C combination R5 and C4 determine the time constant of the timer and ensure it switches off after some 15 to 30 seconds, preferably about 20 to 25 seconds. Capacitors C3 and C5 are stabilizing controls for the 1C and the connection from pin 5 to pin 10 of the 1C is the connection from the output of the monostable timer to enable the astable pulser.

It should be noted that the points marked 'A' and 'B' correspond to the normal connection points for a conventional bi-metallic flasher unit in normal non-cancelling systems. Thus by removing the conventional bi-metallic flasher unit and plugging-in a module, comprising the circuitry between points A and B, and providing an ground connection for point C an existing circuit can easily be converted to be self-cancelling.

Figure 3:
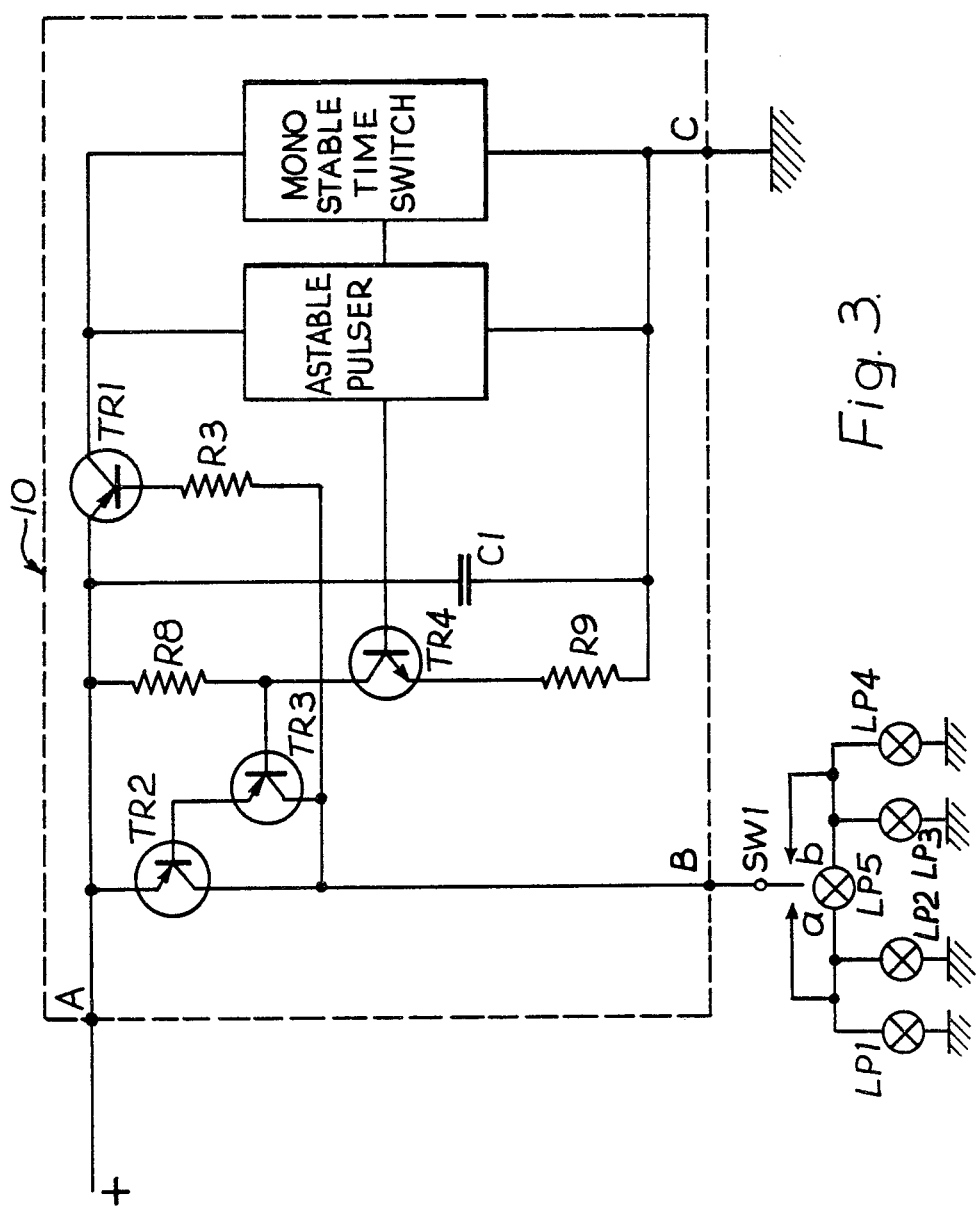
FIG. 3 is a diagram similar to FIG. 1 but showing a second preferred embodiment.
Figure 4:
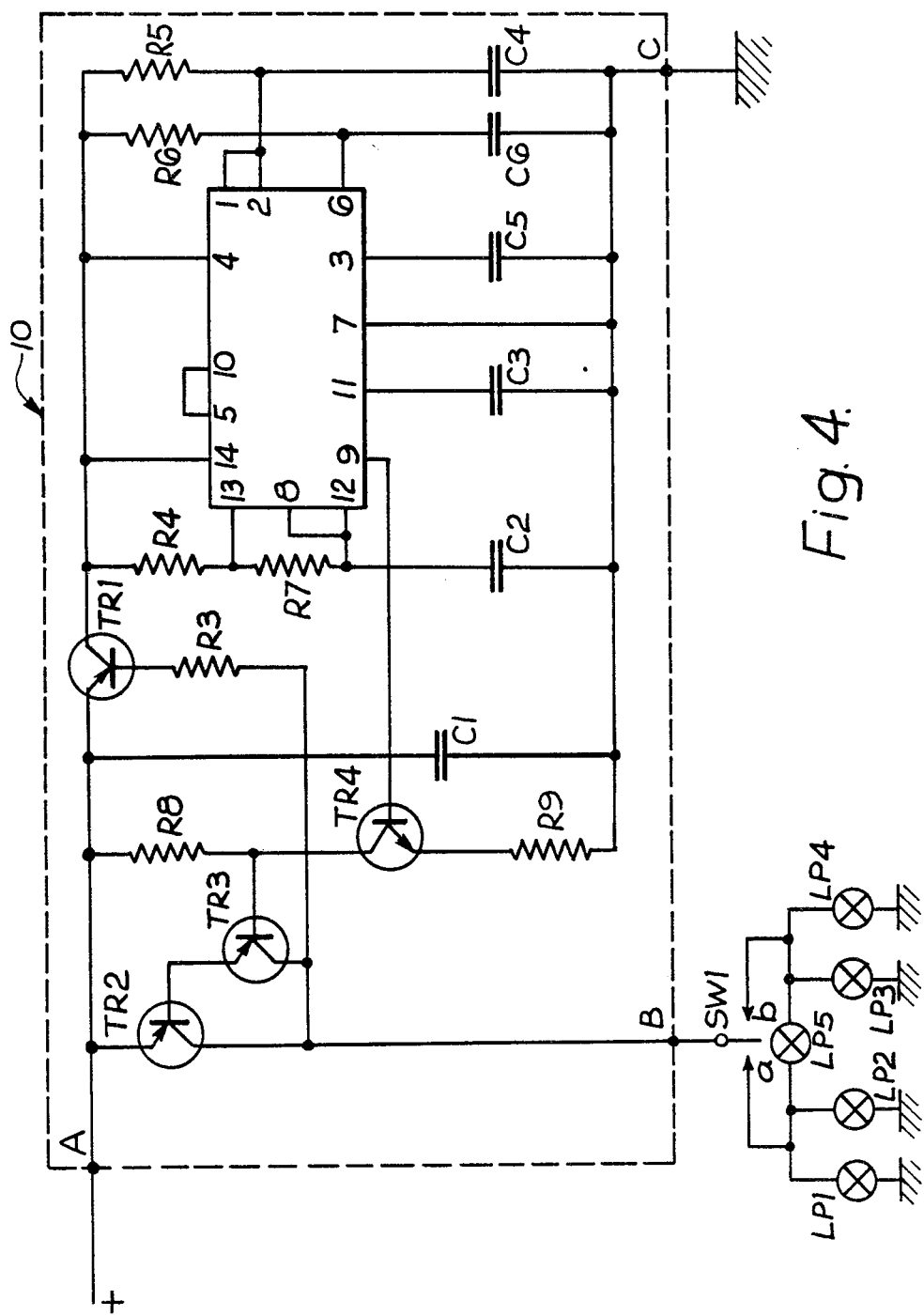
FIG. 4 is a diagram similar to that of FIG. 2 but relating to the arrangement of FIG. 3.

A second preferred embodiment of indicator arrangement 10 of the invention shown in FIGS. 3 and 4 comprises lamps Lp1 to Lp4 and a slector switch SW1. This configuration of switch and lamps is conventional. Lp1 and Lp2 are left-hand indicator lamps, Lp3 and Lp4 are right-hand indicator lamps, and Lp5 is a warning lamp. The supply to the lamps from the power source (not shown) is via transistors TR2 and TR3 which can be switched on and off. The line from source to SW1 is connected to a time switch controlling a pulser by a transistor TR1. Capacitor C1 prevents any pulsing in the circuit to its left from falsely activating the time switch. Operation of the circuit will now be described.

With switch SW1 in its centre position the lamps Lp1–5 are unlit, transistor TR1 is held off and the timing circuits do not operate.

With SW1 operated to position "a" transistor TR1 turns on and power is supplied to the timing circuit and to the pulsing circuit. The monostable time switch switches on and enables the astable pulser circuit, the output of which switches transistor TR4 on and off. Transistor TR4 in turn switches transistors TR2 and TR3 on and off. With transistors TR2 and TR3 switched on lamps LP1, LP2 and LP5 are lit. During the period that transistors TR2 and TR3 are switched on, the potential difference developed across the transistors TR2 and TR3 is sufficient to ensure that transistor TR1 remains on. With transistors TR2 and TR3 switched off the lamps are unlit. Thus the lamps flash on and off whilst the astable is enabled. On completion of the monostable timing period the monostable holds the astable off and the lamps cease flashing. Reoperation of SW1 to position "a" or "b" will initiate a new period of flashing. A period of flashing can be stopped at any time by restoring SW1 to its centre position.

As will be seen from FIG. 2, the monostable time switch and the astable pulser are, in practice incorporated in an integrated circuit of type NE556. The circuit of FIG. 2, operates precisely as described in relation to FIG. 1. The R/C combination of R4 R7 and C2 determines the time constant of the pulser and ensures a pulsing rate which complies with British legal requirements, currently 60 to 120 cpm. R/C combination R5 and C4 determine the time constant of the timer and ensure it switches off after some 20 to 25 seconds. Capacitors C3, C5 and C6 assist in stabilizing the operation of the integrated circuit and the connection from pin 5 to pin 10 of the integrated circuit is the connection from the output of the monostable timer to enable the astable. It should be noted that the points marked "A" "B" and "C" correspond to the normal connection points for a conventional (for example bi-metal) flasher unit in normal non-cancelling systems. Thus by removing the conventional flasher unit and plugging-in a module comprising the circuitry between points A B and C an existing circuit can easily be converted to be self-cancelling.

The invention is not limited to the precise details of the foregoing and variations can be made thereto. For example, the arrangement can be used on motor vehicles other than motor cycles.

What I claim is:

1. An automatically self-cancelling indicator flasher arrangement for a vehicle comprising: indicator lamps on each side of a vehicle and connectable to a source of power by means of circuitry; said circuitry including in series, a single-pole changeover switch having a central neutral position and two alternative operative positions, and switching means, an oscillator connected to operate said switching means to allow a pulsed flow of current to said lamps when said oscillator is activated, a timer having an "on" period which commences when said timer is activated and which turns off said oscillator at the end of said "on" period; and an electronic switch which connects said oscillator and said timer to a power source, said electronic switch being caused to conduct by current flow therefrom to ground via said indicator lamps upon actuation of said changeover switch from its said central neutral position to either of its said operative positions, said timer and said oscillator being activated upon connection to said power source by conduction of said electronic switch, said switching means having values such that the potential difference developed across said switching means between said power source and said changeover switch during the period when said changeover switch is actuated from its said central neutral position to an operative position being sufficient to maintain said electronic switch in its conducting condition, and return of said changeover switch to its said central neutral position serving to cause said electronic switch to cease conducting thereby disconnecting said power source from said timer and said oscillator, and thus resetting said timer.

2. An automatically self-cancelling indicator flasher arrangement for a vehicle as set forth in claim 1, wherein said electronic switch comprises a transistor and said switching means comprises series resistors connected between said transistor and said changeover switch and providing an aggregate resistance sufficient to prevent illumination of the lamps upon actuation of said changeover switch to either of its said operative positions, and a relay having a contact closable under the control of said oscillator to short circuit selected ones of said series resistors to permit sufficient voltage to flow to corresponding said lamps to illuminate them while leaving in circuit at least one said resistor to provide a sufficient voltage drop for said transistor to be kept on.

3. An automatically self-cancelling indicator flasher arrangement for a vehicle as set forth in claim 1, wherein said electronic switch comprises a first transistor and said switching means comprises a second transistor pulsed from the oscillator by way of third and fourth transistors.

4. A module capable of replacing a flasher unit in a conventional indicator flasher arrangement to form an indicator flasher arrangement as set forth in claim 1, 2 or 3 comprising a first ground connection, a second power connection, a third connection for a changeover switch, control circuitry within said module and between these three connections including said switching means, disposed between said power connection and said third connection, said oscillator capable of supplying pulses to the switching means, and said timer having an on period which commences upon actuation of said changeover switch and which de-activates said oscillator at the end of said on period.

* * * * *